United States Patent [19]

Coulter

[11] Patent Number: 4,827,974

[45] Date of Patent: May 9, 1989

[54] TOP ENTRY EXPANSIBLE TUBE VALVE

[75] Inventor: John H. Coulter, Oakland, Calif.

[73] Assignee: Grove Valve and Regulator Company, Oakland, Calif.

[21] Appl. No.: 239,942

[22] Filed: Sep. 2, 1988

[51] Int. Cl.⁴ .................. F16K 31/12; F16K 31/145
[52] U.S. Cl. .................................. 137/549; 251/61.1; 137/489.5
[58] Field of Search ............ 137/489, 489.5, 549; 251/61.1

[56] References Cited

U.S. PATENT DOCUMENTS

| 3,306,569 | 2/1967 | Bryant | 251/61.1 |
| 3,748,837 | 7/1973 | Billeter | 137/549 |
| 3,942,756 | 3/1976 | Brumm et al. | 251/61.1 |
| 4,715,578 | 2/1987 | Seltzer | 251/61.1 |

FOREIGN PATENT DOCUMENTS

| 587581 | 11/1959 | Canada | 251/61.1 |
| 1021540 | 1/1965 | United Kingdom | 251/61.1 |

Primary Examiner—A. Michael Chambers
Attorney, Agent, or Firm—Melvin R. Stidham

[57] ABSTRACT

A top entry expansible tube valve has a generally cylindrical receptacle in the valve body disposed transversely of the flow passageways to receive a slotted core sleeve with a central barrier and expansible elastomer sleeve sealed around it. A generally circular cap closure is bolted to the valve body to seal around the access opening and a perforated sleeve is secured between the cap closure and the core sleeve so that the cap closure and core sleeve, with expansible tube thereon, may be removed as a unit for inspection.

5 Claims, 1 Drawing Sheet

TOP ENTRY EXPANSIBLE TUBE VALVE

BACKGROUND OF THE INVENTION

This invention relates to an expansible sleeve type fluid flow control valve or pressure regulator of the type disclosed in U.S. Pat. No. 3,306,569, granted Feb. 28, 1967, to A. U. Bryant and assigned to the assignee of this invention.

Generally, the valve disclosed in that patent comprises a tubular housing having inlet and outlet flow passageways around which are sealed the ends of an elastomer expansible tube. The expansible tube is carried on a cylindrical core sleeve or cage that has a circular barrier across it intermediate its ends around which the expansible sleeve is sealed. There are inlet slots around the sleeve on the upstream side of the barrier and outlet slots on the downstream side of the barrier. A control pressure fluid is in a jacket around the sleeve so that flow through the valve is possible only when upstream fluid pressure acting on the expansible sleeve through the inlet slots is able to overcome the tension of the expansible sleeve plus the pressure fluid in the chamber around it to expand the sleeve outward. When this occurs, the fluid flows out the inlet slots and around the barrier, and then back through the downstream slots to the outlet flow passage.

Valves of this type have been highly successful in operation for various services, including the regulation of pressure. However, the elastomeric expansible tube, as a dynamic element, is subject to wear and occasional rupture and, therefore, periodic inspection and servicing is required. In order to inspect and service the expansible tube and other interior parts, it is generally necessary to remove the valve from the line in order to gain access to the core sleeve and expansible tube.

OBJECTS OF THE INVENTION

It is an object of the invention to provide an expansible tube valve that is conditioned for inspection and servicing of the interior without requiring removable of the valve body from the line.

It is a further object of this invention to provide a top entry expansible tube valve.

It is a further object of this invention to provide an expansible tube valve with circuitous flow paths and expansion chambers for quieter operation.

Other objects and advantages of this invention will become apparent from the description to follow, particulatly when read in conjunction with the accompanying drawing.

SUMMARY OF THE INVENTION

In carrying out this invention, there is provided a valve body with more or less conventional flow passageways with means, such as flanges, for connection of the valve body into a pipeline. A generally cylindrical, open ended receptacle is disposed within the valve body transversely across the flow passages at an angle so that the flow passageways are in communication with the opposite ends of the receptacle. Within the receptacle is secured a core sleeve or cage with upstream and downstream slots and a central barrier as in present configurations. An elastomer, expansible sleeve is sealed around and between the ends of the core sleeve and the receptacle, and between its ends, it seals around the central barrier. A circular cap closure is bolted to the valve body in alignment with the receptacle, so that access to the interior of the valve body, and to the flexible tube, is possible simply by removing the closure cap. A perforated sleeve is secured between the closure cap and the inlet end of the core sleeve to provide quieter flow into the core sleeve. The perforated sleeve also transmits compressive bolting loads to effect a pressure seal between the flanged ends of the elastomeric, expansible tube and the valve body and core sleeve.

DESCRIPTION OF A PREFERRED EMBODIMENT

Figure 2:
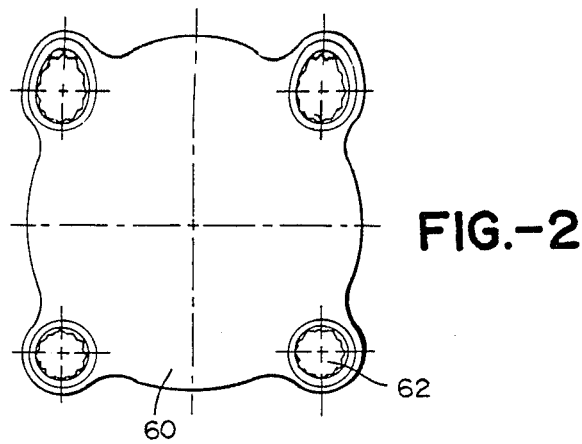
FIG. 2 is a plan view of the top entry closure cap.
Figure 1:
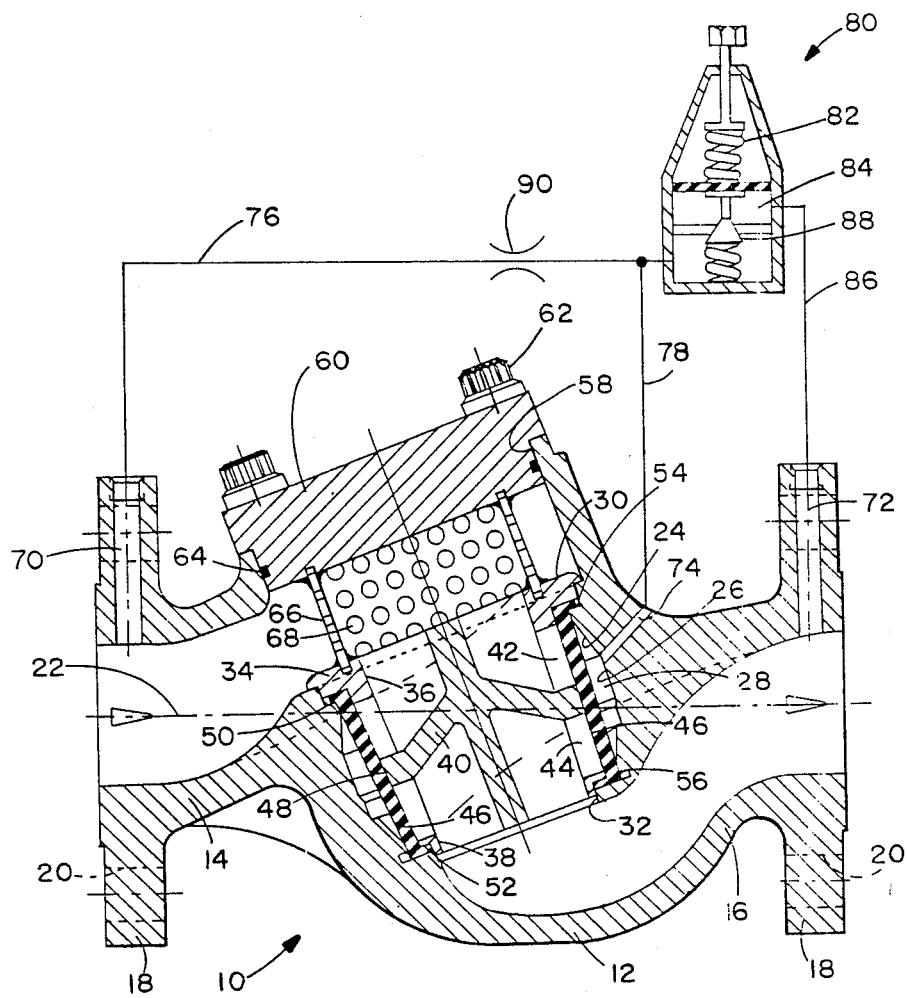
FIG. 1 is a view in vertical section of a top entry expansible tube valve embodying features of this invention with control pressure means shown schematically.

Referring now to the drawing with greater particularlity, the top entry expansible tube valve 10 of this invention includes a valve body 12 having upstream and downstream flow passageways 14 and 16, each with suitable means, such as flanges 18 with bolt holes 20 therethrough for connection of the valve body 12 into a pipeline (not shown).

Formed in the valve body transversely of the axis 22 of the flow passageways 14 and 16 is a generally cylindrical receptacle 24, the intermediate portion of which is of enlarged internal diameter at 26 to provide a control pressure fluid jacket space 28 for purpose to be hereinafter described. The upper and lower ends 30 and 32 of the receptacle 24 are open to and in full communication with the flow passages 14 and 16.

A core sleeve 34 having aligned upstream and downstream flow passageways 36 and 38 and a central barrier 40 is seated in the receptacle 24. Flow from the inlet 36 to outlet 38 is provided through a spaced series of inlet and outlet slots 42 and 44 around the intermediate barrier 40. An expansible tube 46 of a suitable elastomer normally seals on a cylindrical sealing surface 48 around the central barrier 40. Outturned and inturned flanges 50 and 52 at the upstream and downstream ends, respectively, of the expansible tube 46 seal between the core sleeve or cage 34 and complementary surfaces 54 and 56 at opposite ends of the receptacle. Preferably, the core sleeve 34 and flexible tube 46 are slightly tapered of frustoconical configuration to facilitate their removal from the receptacle 24.

Disposition of the receptacle 24 and core sleeve 34 at an angle to the axis 22 of the flow passageways 14 and 16 rotates the inlet 36 and outlet 38 of the core sleeve 34 closer to that axis 22.

An access opening 58 is provided in the valve body 12 for direct access to the receptacle 24, as well as to the core sleeve 34 and expansible tube 46. The access opening 58 is closed by a suitable closure cap 60, which is bolted to the valve body 12 by cap screws 62 and sealed by suitable means such as an O-ring 64. A sleeve 66 with numerous perforations 68 therein is welded or otherwise secured between the closure cap 60 and the upstream end 36 of the core sleeve 34 so that the closure cap 60 and core sleeve 34 may be removed as a unit for inspection of the interior and the expansible sleeve 46. The perforations 68, as well as the expanded chamber in the valve body 12 upstream of the core sleeve 34 tend to provide for quieter flow through the valve body 12.

For regulation of pressure of the downstream flow passageway 16 an inlet or upstream connector 70 is provided in the upstream flange 18 to open into the upstream passageway 14 and an outlet connector 72 is provided in the downstream flange 18 for opening into the downstream flow passageway 16. A jacket connector 74 is provided through the valve body 12 to open into the jacket space 28. Suitable lines 76 and 78 open to the inlet side of the pilot valve 80. Should pressure in the downstream line 16 fall below a predetermined level as set by a spring 82, the spring will overcome pressure in a sensing chamber 84 which is connected to the downstream side 72 by means of a suitable line 86. This opens the valve 88 and unloads the controlling pressure in the jacket 26 through lines 78 and 86 to the downstream line 16, enabling pressure within the core sleeve 36 to overcome the jacket pressure 26 and allow the flexible tube 46 to expand outwardly, enabling flow around the central barrier 40 to the outlet slots 44 and then out through the downstream passageway 16. In the meantime, an orifice 90 in the load line 76 retards buildup of pressure in the jacket 46 until the desired pressure in the downstream line is sensed to overcome the spring 82 in the pilot valve 80 to prevent further dumping of the jacket 26.

Of course, operation of the pilot valve 80 forms no part of this invention and the jacket 46 can be loaded by any suitable means, such as a pressure regulated gas bottle.

Whatever the source of the control pressure, the interior of the top entry expansible tube valve 10 can be readily gained by removing the cap screws 62 and removing the cap closure 60, the perforated sleeve 66 and the core sleeve 30, together with the expansible tube 46 through the access opening 58. It is not necessary to unbolt the valve body 28 from the pipeline (not shown) or to maintain proper spacing of complementary pipeline flanges. It is further not necessary to disturb the pilot valve 80 and its associated tubing 76, 78 and 86.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. An expansible tube valve comprising:
   a valve body having axially aligned inlet and outlet flow passageways;
   means on the outer ends of said flow passageways for connecting said valve body into a pipeline;
   means forming a generally cylindrical receptacle in said valve body between and in open communication at both ends with said flow passageways;
   a core sleeve secured in said receptacle;
   means forming two axially spaced series of inlet and outlet slots around said core sleeves;
   a barrier across said core sleeve intermediate said spaced series of slots;
   a sealing surface around said barrier;
   an expansible tube on said core sleeve having an intermediate sealing portion normally sealing around said sealing surface, the ends of said expansible sleeve sealing around and between said core sleeve and said receptacle upstream and downstream of said inlet and outlet slots, respectively;
   the internal diameter of said receptacle being enlarged intermediate its ends to form a jacket around said expansible tube;
   means forming an access opening in said valve body in alignment with said receptacle;
   a closure cap closing and sealing said access opening; and
   removable means securing said closure cap to said valve body.

2. The expansible tube valve defined by claim 1 wherein:
   the axis of said receptacle is disposed at an angle of less than 90° to the axis of said flow passageways.

3. The expansible tube valve defined by claim 1 including:
   a perforated sleeve secured between said closure cap and the inlet end of said core sleeve.

4. The expansible tube valve defined in claim 1 including:
   an expansion chamber in said valve body upstream of said receptacle.

5. The expansible tube valve defined by claim 3 wherein:
   said core sleeve and expansible tube are frusto-conical, tapering inward from the inlet end of said core sleeve to facilitate removal of said core sleeve and expansible tube from said receptacle together with said closure cap.

* * * * *